United States Patent [19]

Kajiwara et al.

[11] Patent Number: 5,218,061
[45] Date of Patent: Jun. 8, 1993

[54] PARTIALLY POST-GLYCIDYLATED EPOXY RESIN, EPOXY RESIN COMPOSITION AND CURED PRODUCT THEREOF

[75] Inventors: Yoshitaka Kajiwara, Yono; Shoushi Takahashi, Tokyo; Kenichi Mizoguchi, Yono; Sumio Saito, Tokyo, all of Japan

[73] Assignee: Nippon Kayaku Kabushiki Kaisha, Tokyo, Japan

[21] Appl. No.: 757,311

[22] Filed: Sep. 10, 1991

[30] Foreign Application Priority Data

Sep. 17, 1990 [JP] Japan .................. 2-243805

[51] Int. Cl.$^5$ ................... C08G 59/14; C08G 59/04
[52] U.S. Cl. ..................... 525/523; 528/97; 528/98; 528/99; 528/100; 528/102; 528/103; 528/104; 428/413
[58] Field of Search ............ 528/97, 99, 100, 103, 528/104, 98, 102; 525/523; 428/413

[56] References Cited

U.S. PATENT DOCUMENTS 4,623,701 11/1986 Massingill .................. 525/523
4,952,647 8/1990 Shirtum et al. .............. 525/523

FOREIGN PATENT DOCUMENTS 113997   5/1980 China .
77104229 5/1980 China .
1-168679 7/1989 Japan .
1-168680 7/1989 Japan .
1-168722 7/1989 Japan .
2-142818 5/1990 Japan .

OTHER PUBLICATIONS

Journal of Applied Polymer Science, vol. 19, pp. 609–617, "Studied in the Molecular Weight Distribution of Epoxide Resins, III, Gel Permeation Chromatography of Epoxide Resins Subject to Postglycidylation" (1975).

Primary Examiner—John C. Bleutge
Attorney, Agent, or Firm—Nields & Lemack

[57] ABSTRACT

The present invention relates to a novel polyfunctional epoxy resin having two phenolic glycidyl ether groups, one or more of alcoholic glycidyl ether groups and one or more of alcoholic hydroxyl groups in one molecules. The present invention further provides an epoxy resin composition comprising the epoxy resin. The cured product obtained from the epoxy resin composition according to the present invention is excellent in heat resistance, toughness, adhesion property and water proofness, and it is extremely useful for a wide range of application uses such as molding materials, casting materials, laminate materials, coating materials, adhesives and photoresists.

9 Claims, No Drawings

PARTIALLY POST-GLYCIDYLATED EPOXY RESIN, EPOXY RESIN COMPOSITION AND CURED PRODUCT THEREOF

BACKGROUND OF THE INVENTION

The present invention relates to an epoxy resin of excellent heat resistance, toughness and water proofness, an epoxy resin composition and a cured product thereof. The composition according to the present invention is extremely useful to a wide range of application uses such as molding materials, casting materials, laminate materials, composite materials, coating materials, adhesives and resists.

Epoxy resins are cured by various kinds of curing agents into cured products generally having excellent mechanical property, water proofness, chemical resistance, heat resistance and electric property and they have been utilized in a wide range of application uses such as adhesives, coating materials, laminates, molding materials and casting materials. An epoxy resin which has been industrially used most generally is a liquid or solid bisphenol A type epoxy resin obtained by reacting epichlorohydrine with bisphenol A. In addition, a flame retardant solid epoxy resin obtained by reacting tetrabromo bisphenol A with a liquid bisphenol A type epoxy resin or the like has been used industrially as a general-purpose epoxy resin.

Further, a polyfunctional epoxy resin prepared by entirely epoxidizing the alcoholic hydroxyl groups of the bisphenol A type epoxy resin has been reported in U.S. Pat. No. 4,623,701.

However, the general-purpose epoxy resin described above involves a drawback that the heat resistance is reduced although the toughness is increased in the cured product obtained by using this resin as the molecular weight thereof is increased. On the other hand, the cured product obtained from the polyfunctional epoxy resin obtained by entirely epoxidizing the alcoholic hydroxyl groups of the general-purpose epoxy resin has a drawback that it becomes brittle although the heat resistance is improved. Meanwhile, with remarkable development in the electronic industry or the like in recent years, heat resistance and toughness required for electric insulative materials used therefor has become severer and the development of an epoxy resin of excellent heat resistance and toughness has been demanded.

SUMMARY OF THE INVENTION

In view of the foregoing situations, the present inventors have made an earnest study looking for an epoxy resin of excellent heat resistance and toughness and, as a result, have accomplished the present invention based on the finding that an epoxy resin formed by epoxidizing the phenolic hydroxyl groups and a specified ratio of the alcoholic hydroxyl groups of a compound represented by the formula (2):

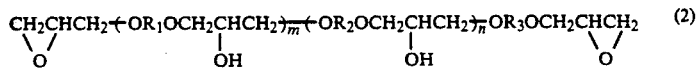

or the formula (3):

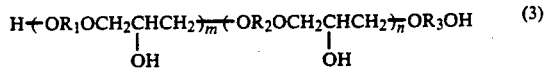

wherein $R_1$, $R_2$, $R_3$, m and n have the same meanings as in the formula (1) to be described later, has excellent heat resistance and toughness together.

That is, the present invention provides an epoxy resin represented by the formula (1):

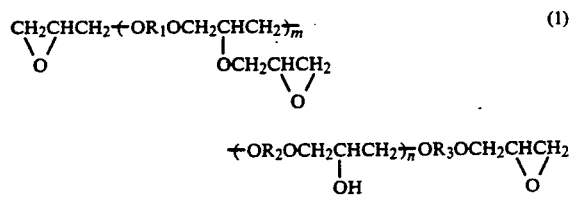

wherein $R_1$, $R_2$ and $R_3$ independently represent a divalent group represented by the formula:

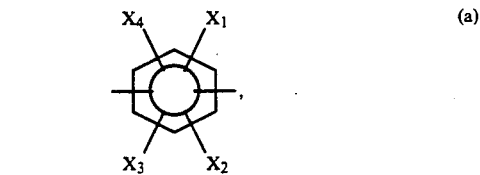

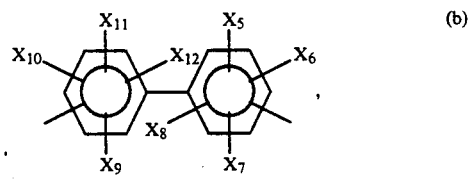

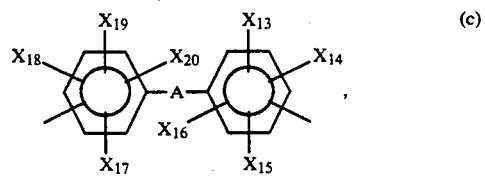

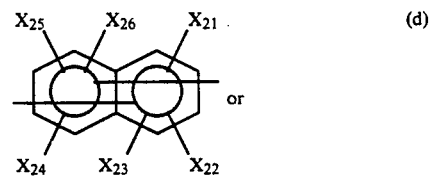

-continued

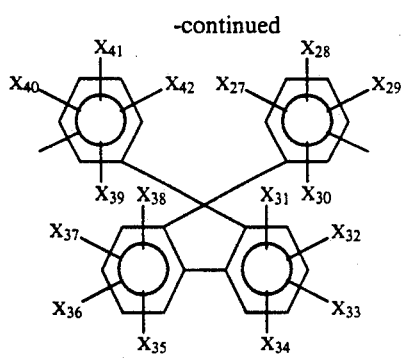
(e)

wherein A represents alkylene; cycloalkylene; alkylene substituted by halogen, cycloalkyl or aryl; —O—; —S—; —S—S—;

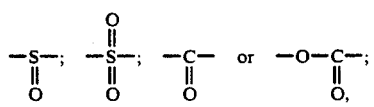

$X_1$ through $X_{42}$ each independently represent hydrogen, alkyl group or halogen; m and n each represents an integer 1 or greater, and

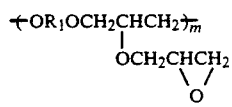

and

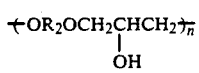

are arranged in a random sequence.

The present invention further provides an epoxy resin as defined above, wherein a hydrolyzable chlorine content is not greater than 0.15%.

The present invention further provides an epoxy resin composition comprising the epoxy resin as defined above, a curing agent and, if required, a curing promoter.

The present invention further provides a cured product of the epoxy resin composition as defined above.

The present invention further provides an epoxy resin composition used for laminated boards comprising the epoxy resin composition as defined above.

The epoxy resin according to the present invention can be obtained, for example, by reacting the phenolic hydroxyl groups and alcoholic hydroxyl groups of the compound represented by the formula (2) or the formula (3) with epichlorohydrine under the presence of a controlled amount of an alkali metal hydroxide in combination with dimethyl sulfoxide, a quaternary ammonium salt or 3-dimethyl-2-imidazolidinone.

If the reaction between the alcoholic hydroxyl groups of the compound represented by the formula (2) and epichlorohydrine is conducted under the presence of a Lewis acid catalyst as employed in the reaction of usual alcohols and epichlorohydrine, it is difficult to obtain an epoxy resin according to the present invention in which only the alcoholic hydroxyl groups of the compound represented by the formula (2) are epoxidized since the reaction between the epoxy groups of the compound represented by the formula (2) and the alcoholic hydroxyl groups is taken place simultaneously. Further, only under the presence of a strong alkali, if epichlorohydrine is used in excess and brought into reaction with the compound of the formula (2), epichlorohydrine does not react with the alcoholic hydroxyl groups. The present inventors have made an earnest study and found that the alcoholic hydroxyl group of the epoxy resin represented by the formula (2) is more reactive than that of usual alcohols and when an alkali metal hydroxide is present together with dimethyl sulfoxide, a quaternary ammonium salt or 1,3-dimethyl-2-imidazolidinone, the reaction between the alcoholic hydroxyl groups and epichlorohydrine can surprisingly be conducted selectively and, further, that the alcoholic hydroxyl groups of the epoxy resin represented by the formula (2) can be epoxidized at a desired ratio by adjusting the amount of the alkali metal hydroxide, and have accomplished the present invention.

The reaction between the phenolic hydroxyl groups and the alcoholic hydroxyl groups of the compound represented by the formula (3) and epichlorohydrine can be taken place by the method as described above or under the presence of a Lewis acid catalyst. However, the reaction under the presence of the Lewis acid catalyst is not preferred since reaction products formed by the reaction of epichlorohydrine with the hydroxyl groups of chlorohydrine as the intermediate product are formed in a great amount to increase the hydrolyzable chlorine content remarkably and lower the epoxy group content in the obtained epoxy resin.

DETAILED DESCRIPTION OF THE INVENTION

The present invention will now be described more specifically.

In the formula (1), examples for (a):

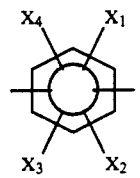

may include

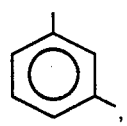
(a-1)

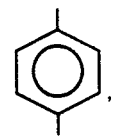
(a-2)

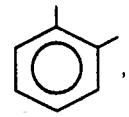
(a-3)

-continued
(a-4) 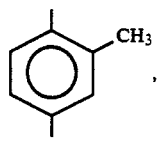
(a-5) 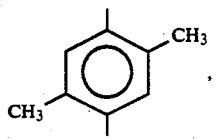
(a-6) 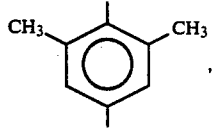
(a-7) 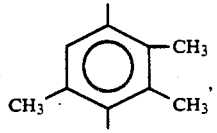
(a-8) 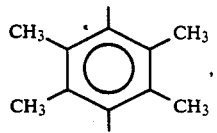
(a-9) 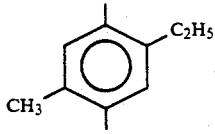
(a-10) 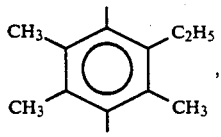
(a-11) 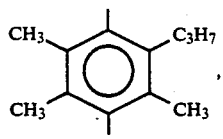
(a-12) 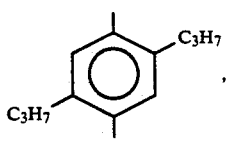
(a-13) 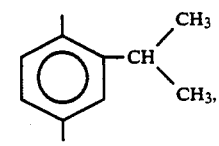
-continued
(a-14) 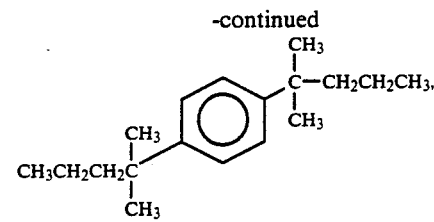
(a-15) 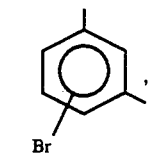
(a-16) 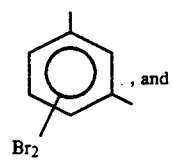, and
(a-17) 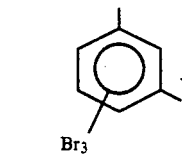
Examples for (b):
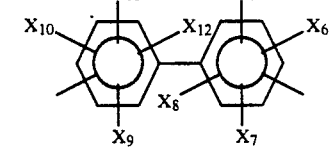
may include
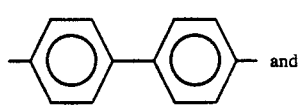 and (b-1)
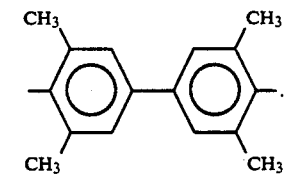 (b-2)
Examples for (c):
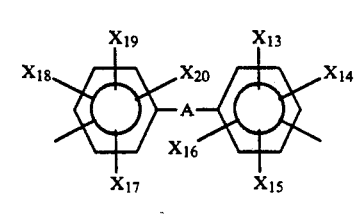
may include

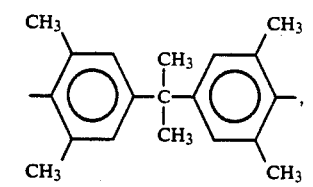 (c-1)
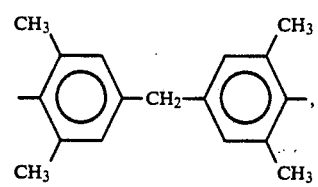 (c-2)
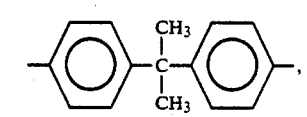 (c-3)
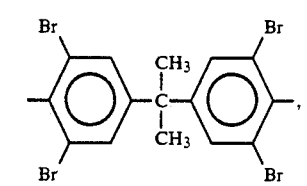 (c-4)
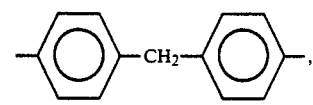 (c-5)
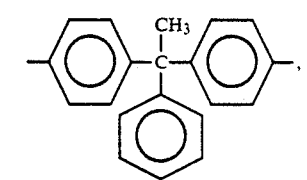 (c-6)
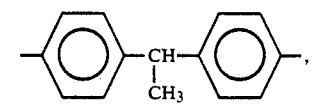 (c-7)
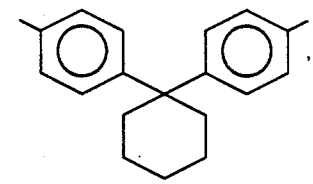 (c-8)
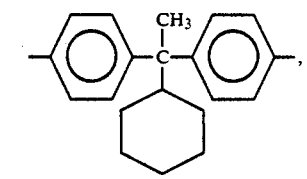 (c-9)
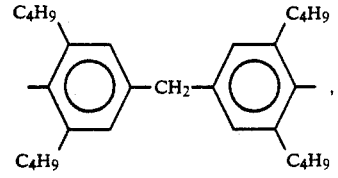 (c-10)
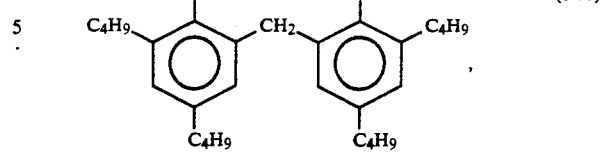 (c-11)
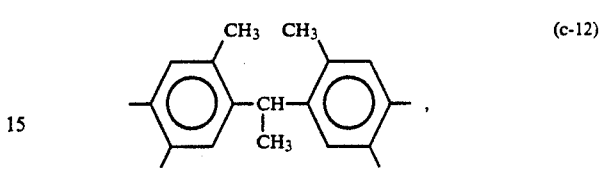 (c-12)
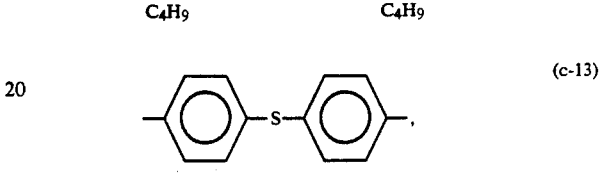 (c-13)
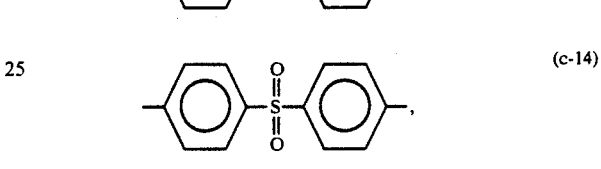 (c-14)
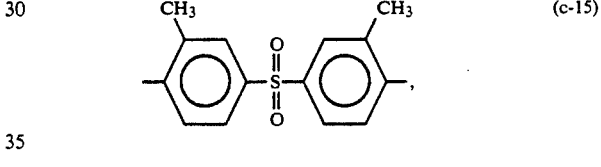 (c-15)
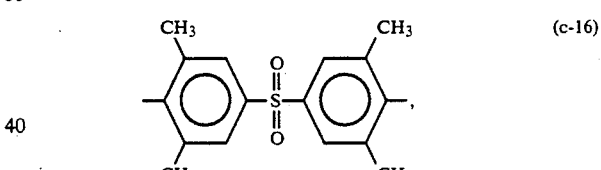 (c-16)
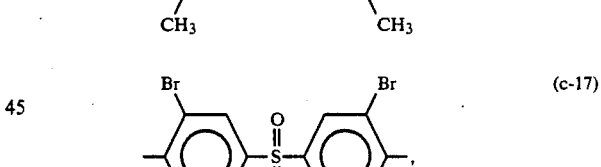 (c-17)
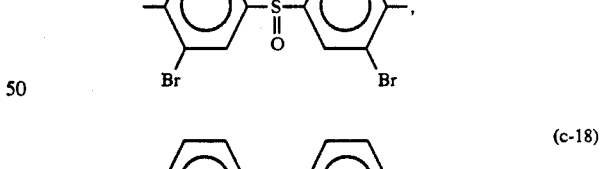 (c-18)
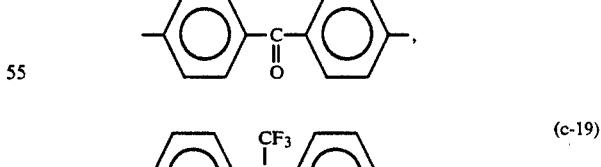 (c-19)
and
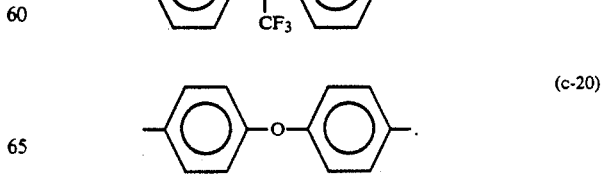 (c-20)
Examples for (d):

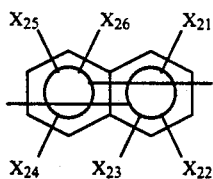

may include

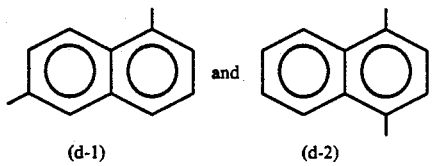

Examples for (e):

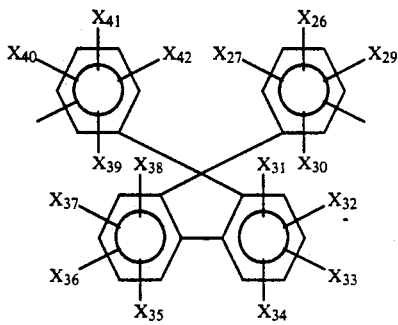

may include

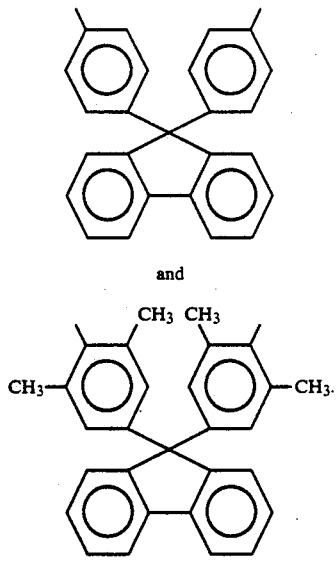

But (a), (b), (c), (d) and (e) for $R_1$, $R_2$ and $R_3$ are not restricted to those exemplified above. Further, $R_1$, $R_2$ and $R_3$ in the formula (1) may be identical or different from each other.

In the formula (1), each of m and n is 1 or greater, $m/(m+n)$ is preferably from 0.10 to 0.80 and, more preferably, from 0.15 to 0.60 and m+n is preferably from 2 to 13 and, more preferably, from 2 to 6. If $m/(m+n)$ is less than 0.10, it is not preferred since the heat resistance of the cured product obtained by using it is insufficient. Further, if $m/(m+n)$ is in excess of 0.80, it is not preferred since the cured product obtained by using it becomes brittle. Further, if m+n exceeds 13, it is not preferred since the softening point and the melt viscosity of the epoxy resin become high, resulting in poor workability.

Further, for $R_1$, $R_2$ and $R_3$ in the formula (1), the formula (C-3) or the formula (C-4) or a mixture of the formula (C-3) and the formula (C-4) are particularly preferred. Since cured products obtained by such epoxy resins are extremely excellent both in the heat resistance and the toughness.

In the present invention, the hydrolyzable chlorine content is defined as below. An epoxy resin is dissolved in dioxane, to which a 1N potassium hydroxide solution in ethanol is added and heated under reflux for 30 min. Then, dissociated chlorine ions are titrated with a silver nitrate solution and the percent ratio by weight of the dissociated chlorine ions to the chlorine atoms in the epoxy resin is defined as the hydrolyzable chlorine content. If the hydrolyzable chlorine content exceeds 0.15%, the property (in particular, electric property) of the cured product is remarkably lowered to such an extent as may no more be suitable to the use as electronic material and, therefore, the hydrolyzable chlorine content is preferably set to not higher than 0.15%.

The reaction between the phenolic hydroxyl groups and the alcoholic hydroxyl groups of the compound represented by the formula (2) or (3) with epichlorohydrine can be taken place under the presence of an alkali metal hydroxide in combination with dimethyl sulfoxide, a quaternary ammonium salt or 1,3-dimethyl-2-imidazolidinone, while controlling the amount of the alkali metal hydroxide. In this case, a solvent such as alcohols, aromatic hydrocarbons, ketones, cyclic compounds and ethers may be used together. Further, dimethyl sulfoxide, quaternary ammonium salt or 1,3-dimethyl-2-imidazolidinone may be used together.

A preferred amount of dimethyl sulfoxide or 1,3-dimethyl-2-imidazolidinone used is from 5 to 300% by weight based on the compound represented by the formula (2) or (3). If the amount is less than 5% by weight based on the compound represented by the formula (2) or (3), it is not preferred since the reaction rate between the hydroxyl groups of the compound represented by the formula (2) or (3) with epichlorohydrine is slow to require a longer reaction time. If the amount exceeds 300% by weight based on the compound represented by the formula (2) or (3), it is not preferred since the effect of increasing the amount is substantially saturated and, on the other hand, the volumic efficiency is worsened.

As the quaternary ammonium salt, there can be mentioned tetramethylammonium chloride, tetramethylammonium bromide and trimethylbenzylammonium chloride, and a preferred amount of use is from 0.3 to 50 g based on one equivalent amount of the hydroxyl groups to be epoxidized of the compound represented by the formula (2) or (3). If the amount is less than 0.3 g based on one equivalent amount of the hydroxyl groups to be epoxidized, the reaction rate between the hydroxyl groups of the compound represented by the formula (2) or (3) and epichlorohydrine is slow to require a longer reaction time which is not preferred. If the amount exceeds 50 g based on one equivalent amount of the hydroxyl groups to be epoxidized, the effect by increase the amount is scarcely eliminated, while the cost becomes expensive.

Epichlorohydrine may be used in an amount greater than the equivalent amount of the hydroxyl groups to be epoxidized of the compound represented by the formula (2) or (3). However, if it exceeds 15 times of the equivalent amount of the hydroxyl groups to be epoxidized, the effect by increasing the amount is substantially eliminated and the volumic efficiency is worsened.

As the alkali metal hydroxide, there can be used sodium hydroxide, potassium hydroxide, lithium hydroxide or calcium hydroxide, with sodium hydroxide being preferred. The amount of the alkali metal hydroxide may be about from 1 to 1.3 equivalent based on one equivalent amount of the hydroxyl groups to be epoxidized of the compound represented by the formula (2) or (3). The alkali metal hydroxide may be solid or in the form of an aqueous solution. In a case of using the aqueous solution, reaction can also be conducted while distilling off the water in the reaction system under an ambient pressure or a reduced pressure out of the reaction system during reaction.

The reaction temperature is preferably from 30° to 100° C. If the reaction temperature is lower than 30° C., the reaction rate is slow to require a longer reaction time. If the reaction temperature exceeds 100° C., side-reaction occurs frequently and it is not preferred. After the reaction is completed and after recovering an excess epichlorohydrine and solvent by distillation under a reduced pressure, the hydrogen halide may be removed from the epoxy resin by using an alkali metal hydroxide while dissolving the resin into an organic solvent. On the other hand, after the reaction is completed, water washing and separation may be carried out to separate by-produced salts and solvents and after recovering excess epichlorohydrine and solvents from the oil layer by distillation under a reduced pressure, the hydrogen halide may be removed from the epoxy resin by using an alkali metal hydroxide while dissolving the resin into an organic solvent. As the organic solvent, there can be mentioned methyl isobutyl ketone, benzene, toluene and xylene, with methyl isobutyl ketone being preferred. They may be used alone or as a mixture of them.

The epoxy resin according to the present invention can be cured, alone or in combination with other epoxy resin, in the same manner as in the usual epoxy resin, by curing with a curing agent while adding, if necessary, a curing promoter or the like.

The curing agent usable in the present invention may include amine type compound, acid anhydride type compound, amide type compound and phenol type compound. As specific examples, there can be mentioned, for example, diaminodiphenylmethane, diethylenetriamine, triethylenetetramine, diaminodiphenyl sulfone, isophoronediamine, dicyandiamide, polyamide resin synthesized from a linolenic acid dimer and ethylenediamine, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, phenol novolak or their modification products, imidazole, BF$_3$-amine complex and guanidine derivatives. Such curing agents may be used alone or as a combination of two or more of them.

The amount of the curing agent used is preferably from 0.7 to 1.2 equivalent amount based on the epoxy groups. If the amount is less than 0.7 equivalent amount or in excess of 1.2 equivalent amount based on the epoxy group, curing may be insufficient in both of the cases and no satisfactory cured product may be obtained.

A curing promoter may be used together with the curing agent. As the curing promoter, there can be mentioned, for example, imidazoles, tertiary amines, phenols and metal compounds. Further, various additives such as organic or inorganic fillers may also be added if required.

The amount of the curing promoter used is preferably from 0.1 to 5.0 parts by weight based on 100 parts by weight of the epoxy resin.

The epoxy resin composition according to the present invention which comprises the epoxy resin according to the present invention, the curing agent and, if necessary, the curing promoter can be easily cured by the same method known in the art to obtain cured products. For example, the epoxy resin according to the present invention is sufficiently mixed with a curing agent, a filler and other additives by using an extruder, kneader or roll to obtain an epoxy resin composition, which is further subjected to melting, casting and then transfer molding, and then heated to 80° C. to 200° C. to obtain cured products.

Further, the resin composition according to the present invention can be dissolved into a solvent, which is then impregnated into a substrate made of glass fiber, carbon fiber, polyester fiber, polyamide fiber, alumina fiber and paper, heated and dried to obtain a prepreg, which is hot press molded to obtain cured products.

The present invention will now be described more specifically referring to examples and comparative examples, in which "parts" are parts by weight unless otherwise specified.

EXAMPLES 1-2, COMPARATIVE EXAMPLES 1-2

After dissolving 394 parts (alcoholic hydroxyl group: 1 eq) of a bisphenol A type epoxy resin (15) of the formula (2):

$R_1$, $R_2$ and $R_3$ in the formula (2): the formula (C-3)
$m+n$ in the formula (2): 3.3 in average
epoxide equivalent weight: 650
hydrolyzable chlorine content: 0.039%
softening point: 81.1° C.
melt viscosity (at 150° C.): 12.5 poise into 925 parts (10 mol) of epichlorohydrine and 462.5 parts of dimethyl sulfoxide. Then, 13.3 parts (0.33 mol) of 98.5% NaOH were added to the solution under stirring at 70° C. for 100 min. After the addition, reaction was conducted for further three hours at 70° C. After the reaction was completed, 250 parts of water were added to conduct water washing. After oil/water separation, most of dimethylsulfoxide and excess unreacted epichlorohydrine were recovered by distillation under a reduced pressure from the oil layer, and the reaction products containing by-produced salts and dimethylsulfoxide were dissolved into 750 parts of methyl isobutyl ketone. Further, 10 parts of 30% NaOH were added and reacted at 70° C. for one hour. After the reaction was completed, the reaction mixture was washed twice with 200 parts of water. After oil/water separation, methyl isobutyl ketone was recovered by distillation from the oil layer to obtain 350 parts of the epoxy resin (1):

epoxide equivalent weight: 444 hydrolyzable chlorine content: 0.054%
softening point: 79.5° C.
melt viscosity (at 150° C.): 11.5 poise.

In the resultant epoxy resin (1), about 1.1 out of 3.3 alcoholic hydroxyl groups in the starting epoxy resin (15) were epoxidized as calculated based on the epoxide equivalent weight.

Further, in the same manner as above while changing the amount of 98.5% NaOH to 24.3 parts (0.60 mol), 365 parts of the epoxy resin (2):
 epoxide equivalent weight: 379
 hydrolyzable chlorine content: 0.067%
 softening point: 76.8° C.
 melt viscosity (at 150° C.): 11.0 poise
were obtained. In the resultant epoxy resin (2), about 1.7 out of 3.3 alcoholic hydroxyl groups in the starting epoxy resin (15) of the formula (2) were epoxidized as calculated based on the epoxide equivalent weight.

As a comparison, in the same manner as described above except for increasing the amount of 98.5% NaOH to 60.9 parts (1.5 mol), 370 parts of the epoxy resin (27):
 epoxide equivalent weight: 280
 hydrolyzable chlorine content: 0.070%
 softening point: 64.2° C.
 melt viscosity (at 150° C.): 7.1 poise
were obtained. In the resultant epoxy resin (27), 3.3 alcoholic hydroxyl groups in the starting epoxy resin (15) of the formula (2) were entirely epoxidized as calculated based on the epoxide equivalent weight.

Further, each of the thus obtained epoxy resins (1)–(2), and the epoxy resins (15) and (27) as the comparison was blended with Kayahard MCD (manufactured by Nippon Kayaku K.K.: methyl endomethylene tetrahydrophthalic anhydride) as a curing agent and 2E4MZ (2-ethyl-4-methylimidazole) as a curing promotor in an amount (shown by weight) shown in Table 1 so that 0.9 acid anhydride groups were present based on one epoxy group of the epoxy resin. Each of the compositions thus obtained was cured under the conditions at 100° C. for 2 hours, at 120° C. for 2 hours and, further, at 200° C. for 5 hours, to prepare test pieces, and heat distortion temperature, bending strength, breaking energy and water absorption were measured in accordance with JIS (Japanese Industrial Standard) K-6911. The results are shown in Table 1.

TABLE 1

|  | Example | | Comparative Example | |
|---|---|---|---|---|
|  | 1 | 2 | 1 | 2 |
| Epoxy resin (1) | 100 | | | |
| Epoxy resin (2) | | 100 | | |
| Epoxy resin (15) | | | 100 | |
| Epoxy resin (27) | | | | 100 |
| Property of resin | | | | |
| Epoxide equivalent weight (g/eq) | 444 | 379 | 650 | 280 |
| Hydrolyzable chlorine content (%) | 0.054 | 0.067 | 0.039 | 0.070 |
| Softening point (°C.) | 79.5 | 76.8 | 81.1 | 64.2 |
| Melt viscosity (150° C., ps) | 11.5 | 11.0 | 12.5 | 7.1 |
| Blend | | | | |
| KAYAHARD MCD | 36.1 | 42.3 | 24.6 | 57.2 |
| 2E4MZ | 1 | 1 | 1 | 1 |
| Property of cured product | | | | |
| Heat distortion temperature (°C.) | 139 | 152 | 105 | 186 |
| Bending strength (25° C., kg/mm$^2$) | 10.8 | 11.2 | 10.8 | 10.3 |
| Bending strength (125° C., kg/mm$^2$) | 5.3 | 6.3 | 0 | 6.6 |
| Breaking Energy (25° C., kg/mm) | 119 | 82 | 157 | 50 |
| Breaking Energy (125° C., kg/mm) | 57 | 39 | 0 | 27 |
| Water absorption (boiling/20 hr, %) | 1.62 | 1.27 | 2.15 | 1.28 |

(*)For the breaking energy, the breaking energy was expressed as the area of stress-strain curve up to breaking in the bending test.

EXAMPLE 3, COMPARATIVE EXAMPLES 3–4

In the same procedures as those in Example 2 except for using, instead of the epoxy resin (15), 580 parts (alcoholic hydroxyl group : 1 eq) of the epoxy resin (16) of the formula (2):
 $R_1$, $R_2$ and $R_3$: mixture of the formula (C-3) and the formula (C-4)
 $m+n$: 2.5 in average
 epoxide equivalent weight: 725
 hydrolyzable chlorine content: 0.106%
 softening point: 86.1° C.
 melt viscosity (at 150° C.): 13.5 poise
 bromine content: 27.7%,
and increasing the amount of 98.5% NaOH from 13.3 parts to 20.3 parts (0.5 mol), 562 parts of the epoxy resin (3):
 epoxide equivalent weight: 474
 hydrolyzable chlorine content: 0.052%
 softening point: 80.0° C.
 melt viscosity (at 150° C.): 12.1 poise
 bromine content: 26.5%
were obtained. In the thus obtained epoxy resin (3), 1.2 out of 2.5 alcoholic hydroxyl groups in the starting epoxy resin (16) were epoxidized as calculated based on the epoxide equivalent weight.

As a comparison, in the same procedures as described above, except for increasing the amount of 98.5% NaOH to 60.9 parts (1.5 mol), 565 g of the epoxy resin (28):
 epoxide equivalent weight: 353
 hydrolyzable chlorine content: 0.052%
 softening point: 75.2° C.
 melt viscosity (at 150° C.): 10.1 poise
 bromine content: 25.2%
were obtained. In the resultant epoxy resin (28), 2.5 alcoholic hydroxyl groups in the starting epoxy resin (16) were entirely epoxidized as calculated based on the epoxide equivalent weight.

Further, the resultant epoxy resin (3) and the epoxy resins (16) and (28) as the comparison were dissolved into methyl ethyl ketone to prepare solutions each at a resin concentration of 80% by weight. The epoxy resin solutions were formed into varnishy epoxy resin compositions by blending dicyandiamide as a curing agent, 2MZ (2-methyl imidazole) as a curing promoter, and methyl cellosolve and dimethylformamide as a solvent in the compositions shown in Table 2 (values based on parts by weight). Each of the compositions was impregnated into glass cloth (WE-18K-BZ2, manufactured by Nitto Boseki Co.) and heated at 110° C. for 30 min to obtain a prepreg of B-stage. The prepreg was stacked by 9 plies and a glass cloth laminate of 1.5 mm thickness was prepared under the molding conditions of 170° C., 40 kgf/cm² for 45 min. Then, according to JIS C-6481, glass transition point, measling resistance and copper foil peeling strength were measured. The results are shown in Table 2.

TABLE 2

|  | Example 3 | Comparative Example 3 | Comparative Example 4 |
|---|---|---|---|
| Epoxy resin (3) | 80 | | |
| Epoxy resin (16) | | 80 | |
| Epoxy resin (28) | | | 80 |
| Property of resin | | | |
| Epoxide equivalent weight (g/eq) | 474 | 725 | 353 |
| Hydrolyzable chlorine content (%) | 0.070 | 0.106 | 0.052 |
| Softening point (°C.) | 80.0 | 86.1 | 75.2 |
| Melt viscosity (150° C., ps) | 12.1 | 13.5 | 10.1 |
| Blend | | | |
| Dicyanediamide | 3.4 | 3.4 | 3.4 |
| Benzyldimethylamine | 0.08 | 0.08 | 0.08 |
| Methyl ethyl ketone | 20 | 20 | 20 |
| Methyl cellosolve | 21 | 21 | 21 |
| Dimethylformamide | 21 | 21 | 21 |
| Property of cured product | | | |
| Glass transition temperature (°C.) | 152 | 128 | 167 |
| Measling resistance* | o | x | o |
| Copper foil peeling strength (kgf/cm) | 1.87 | 1.90 | 1.68 |

*Absence (o) or presence (x) of abnormal appearance after boiling one hour and dipping in a soldering bath at 260° C. for 20 sec.

EXAMPLES 4-5, COMPARATIVE EXAMPLES 5-6

In the same procedures as those in Example 1 except for using, instead of the epoxy resin (15), 350 parts (alcoholic hydroxyl group : 1 eq) of the bisphenol A type epoxy resin (17) of the formula (2):
  $R_1$, $R_2$ and $R_3$: the formula (C-3)
  m+n: 5.2 in average
  epoxide equivalent weight: 910
  softening point: 100.5° C.,
and decreasing the amount of 98.5% NaOH from 13.3 parts to 8.6 parts (0.21 mol), 340 parts of the epoxy resin (4):
  epoxide equivalent weight: 625
  softening point: 95.1° C.
In the thus obtained epoxy resin (4), about 1.0 out of 5.2 alcoholic hydroxyl groups in the starting epoxy resin (17) were epoxidized as calculated based on the epoxide equivalent weight.

In the same procedures except for increasing the amount of 98.5% NaOH to 25.7 parts (0.63 mol), 350 parts of the epoxy resin (5):
  epoxide equivalent weight: 429
  hydrolyzable chlorine content: 0.037%
  softening point: 90.1° C.
was obtained. In the resultant epoxy resin (5), about 2.6 out of 5.2 alcoholic hydroxyl groups in the starting epoxy resin (17) were epoxidized as calculated based on the epoxide equivalent weight.

As a comparison, in the same procedures as described above except for increasing the amount of 98.5% NaOH to 60.9 parts (1.5 mol), 350 parts of the epoxy resin (29):
  epoxide equivalent weight: 293
  hydrolyzable chlorine content: 0.076%
  softening point: 81.3° C.
was obtained. In the resultant epoxy resin (29), 5.2 alcoholic hydroxyl groups in the starting epoxy resin (17) were entirely epoxidized as calculated based on the epoxide equivalent weight.

Each of the resultant epoxy resins (4) and (5), and the epoxy resins (17) and (19) as the comparison was blended with phenol novolak (softening point 80° C.) as the curing agent and TPP (triphenylphosphine) as the curing promoter in the compositions shown in Table 3 (values based on parts by weight) so that 1.0 hydroxyl group of the phenol novolak was present per 1 epoxy group of the epoxy resin. Each of the compositions thus obtained was kneaded at 70° C. for 15 min by a roll and transfer molded at 150° C. for 180 sec, subsequently, cured at 160° C. for 2 hours and further, at 180° C. for 8 hours to prepare test pieces. According to JIS K-6911, heat distortion temperature, bending strength, breaking energy and water absorption were measured. The results are shown in Table 3.

EXAMPLE 6, COMPARATIVE EXAMPLE 7-8

In the same procedures as those in Example 1, except for using, instead of the epoxy resin (15), 885 parts (alcoholic hydroxyl group: 1 eq) of the epoxy resin (18) of the formula (2):
  $R_1$, $R_2$ and $R_3$: the formula (C-4)
  m+n: 2.3 in average
  epoxide equivalent weight: 1018
  softening point: 132.6° C.
  bromine content: 51.9%,
and increasing the amount of 98.5% NaOH from 13.3 parts to 22.3 parts (0.55 mol), 870 parts of the epoxy resin (6):
  epoxide equivalent weight: 657
  hydrolyzable chlorine content: 0.070%
  softening point: 125.3° C.
  bromine content: 50.2%
were obtained. In the thus obtained epoxy resin (6), 1.2 out of 2.3 alcoholic hydroxyl groups in the starting epoxy resin (18) were epoxidized as calculated based on the epoxide equivalent weight.

As a comparison, in the same procedures as described above except for increasing the amount of 98.5% NaOH to 60.9 parts (1.5 mol), 872 parts of the epoxy resin (30):
  epoxide equivalent weight: 503
  hydrolyzable chlorine content: 0.061%
  softening point: 110.7° C.
  bromine content of 48.8%
were obtained. In the resultant epoxy resin (30), 2.3 alcoholic hydroxyl groups in the starting epoxy resin (18) were entirely epoxidized as calculated based on the epoxide equivalent weight.

Further, the resultant epoxy resin (6) and the epoxy resins (18) and (30) as comparison were cured in the same manner as in Example 4 and physical properties of the cured products were measured. The results are shown in Table 3.

TABLE 3

| | Example | | | Comparative Example | | | |
|---|---|---|---|---|---|---|---|
| Item | 4 | 5 | 6 | 5 | 6 | 7 | 8 |
| Epoxy resin (4) | 100 | | | | | | |
| Epoxy resin (5) | | 100 | | | | | |
| Epoxy resin (6) | | | 100 | | | | |
| Epoxy resin (17) | | | | 100 | | | |
| Epoxy resin (29) | | | | | 100 | | |
| Epoxy resin (18) | | | | | | 100 | |
| Epoxy resin (30) | | | | | | | 100 |
| Property of resin | | | | | | | |
| Epoxide equivalent weight (g/eq) | 625 | 429 | 657 | 910 | 293 | 1018 | 503 |

TABLE 3-continued

| Item | Example | | | Comparative Example | | | |
|---|---|---|---|---|---|---|---|
| | 4 | 5 | 6 | 5 | 6 | 7 | 8 |
| Hydrolyzable chlorine content (%) | 0.040 | 0.037 | 0.070 | 0.070 | 0.076 | 0.110 | 0.060 |
| Softening point (°C.) | 95.1 | 90.1 | 125.3 | 100.5 | 81.3 | 132.6 | 110.7 |
| Blend | | | | | | | |
| Phenol novolak | 16.8 | 24.5 | 16.0 | 11.5 | 35.8 | 10.3 | 20.8 |
| TPP | 1 | 1 | 1 | 1 | 1 | 1 | 1 |
| Property of cured product | | | | | | | |
| Heat distortion temperature (°C.) | 106 | 120 | 165 | 99 | 131 | 164 | 166 |
| Bending strength (25° C., kg/mm$^2$) | 11.2 | 10.7 | 10.9 | 10.6 | 11.0 | 11.9 | 12.4 |
| Bending strength (100° C., kg/mm$^2$) | 5.3 | 6.3 | 9.2 | 0.05 | 5.2 | 8.9 | 9.0 |
| Breaking energy (25° C., kg/mm) | 138 | 139 | 93 | 119 | 135 | 82 | 90 |
| Breaking energy (100° C., kg/mm) | 90 | 85 | 85 | 0 | 51 | 75 | 70 |
| Water absorption (boiling/20 hr, %) | 1.95 | 1.55 | 1.12 | 2.18 | 1.39 | 1.11 | 1.13 |

EXAMPLE 7, COMPARATIVE EXAMPLES 9-10

After dissolving 270 parts (alcoholic hydroxyl group: 1 eq) of an epoxy resin (19) represented by the formula (2):

$R_1$, $R_2$ and $R_3$: the formula (a-1)
m+n: 2.1 in average
epoxide equivalent weight: 284
hydrolyzable chlorine content: 0.129%
softening point: 56.0° C.
melt viscosity (at 150° C.): 1.9 poise into 925 parts (10 mol) of epichlorohydrine, were added 5 parts of tetramethylammonium chloride at 70° C. under stirring and, subsequently, 26.4 parts (0.65 mol) of 98.5% NaOH was added for 100 min. After the addition, the reaction was further continued at 70° C. for three hours. After the reaction was completed, the reaction mixture was washed with 250 parts of water. After oil/water separation, unreacted excess epichlorohydrine was recovered by distillation from the oil layer, and the reaction product was dissolved into 750 parts of methyl isobutyl ketone, to which 10 parts (0.075 mol) of 30% NaOH was further added and reacted at 70° C. for one hour. After the reaction was completed, the reaction mixture was washed twice with 200 parts of water. After oil/water separation, methyl isobutyl ketone was recovered by distillation from the oil layer to obtain 250 parts of the semi-solid epoxy resin (7):

epoxide equivalent weight: 206
melt viscosity (at 150° C.): 1.8 poise.

In the resultant epoxy resin (7), about 1.1 out of 2.1 alcoholic hydroxyl groups in the starting epoxy resin (19) were epoxidized as calculated based on the epoxide equivalent weight.

As a comparison, 255 parts of the semi-solid epoxy resin (31) with epoxide equivalent weight of 167, hydrolyzable chlorine content of 0.024% and melt viscosity (at 150° C.) of 1.7 poise were obtained in the same manner as described above while increasing the amount of NaOH to 60.9 parts (1.5 mol). In the resultant epoxy resin (31), 2.1 alcoholic hydroxyl groups in the starting epoxy resin were entirely epoxidized as calculated based on the epoxide equivalent weight.

Further, the resultant epoxy resin (7) and the epoxy resins (19) and (31) as the comparison were blended in the same manner as in Example 1 with the compositions shown in Table 4 (values based on parts by weight) to obtain epoxy resin compositions. They were further cured in the same procedures as those in Example 1 and physical properties of the cured products were measured. The results are shown in Table 4.

TABLE 4

| | Example | Comparative Example | |
|---|---|---|---|
| | 7 | 9 | 10 |
| Epoxy resin (7) | 100 | | |
| Epoxy resin (19) | | 100 | |
| Epoxy resin (31) | | | 100 |
| Property of resin | | | |
| Epoxide equivalent weight (g/eq) | 206 | 284 | 167 |
| Hydrolyzable chlorine content (%) | 0.059 | 0.129 | 0.024 |
| Softening point (°C.) | semi-solid | 56.0 | semi-solid |
| Melt viscosity (150° C., ps) | 1.8 | 1.9 | 1.7 |
| Blend | | | |
| KAYAHARD MCD | 77.8 | 56.4 | 95.9 |
| 2E4MZ | 1 | 1 | 1 |
| Property of cured product | | | |
| Heat distortion temperature (°C.) | 140 | 104 | 167 |
| Bending strength (25° C., kg/mm$^2$) | 14.1 | 14.8 | 12.8 |
| Bending strength (125° C., kg/mm$^2$) | 7.0 | 0 | 6.1 |
| Breaking Energy (25° C., kg/mm) | 160 | 162 | 84 |
| Breaking Energy (125° C., kg/mm) | 58 | 0 | 20 |
| Water absorption (boiling/20 hr, %) | 1.75 | 3.75 | 1.51 |

EXAMPLE 8, COMPARATIVE EXAMPLES 11-12

In the same procedures as those in Example 7 except for using, instead of the epoxy resin (19), 382 parts (alcoholic hydroxyl group : 1 eq) of the epoxy resin (20) of the formula (2):

$R_1$, $R_2$ and $R_3$: the formula (C-5)
m+n: 2.6 in average
epoxide equivalent weight: 496
hydrolyzable chlorine content: 0.104%
softening point: 65° C.
melt viscosity (at 150° C.): 2.2 poise, 380 parts of the epoxy resin (8):
epoxide equivalent weight: 320
hydrolyzable chlorine content: 0.069%
softening point: 60° C.
melt viscosity (at 150° C.): 2.0 poise were obtained. In the thus obtained epoxy resin (8), about 1.3 out of 2.6 alcoholic hydroxyl groups in the starting epoxy resin (20) were epoxidized as calculated based on the epoxide equivalent weight.

As a comparison, in the same procedures as described above except for increasing the amount of 98.5% NaOH to 60.9 parts (1.5 mol), 385 parts of the epoxy resin (32):
epoxide equivalent weight: 247
hydrolyzable chlorine content: 0.035%
softening point: 55.0° C.
melt viscosity (at 150° C.): 1.8 poise were obtained. In the resultant epoxy resin (32), 2.6 alcoholic hydroxyl groups in the starting epoxy resin (20) were entirely epoxidized as calculated based on the epoxide equivalent weight.

Further, the resultant epoxy resin (8), the epoxy resins (20) and (32) as comparison were blended in the same manner as in Example 1 in the compositions shown in Table 5 (values based on parts by weight) to obtain epoxy resin compositions. They were further cured in the same manner as in Example 1 and physical properties of the cured products were measured. The results are shown in Table 5.

EXAMPLE 9, COMPARATIVE EXAMPLES 13-14

In the same procedures as those in Example 7 except for using, instead of the epoxy resin (19), 606 parts (alcoholic hydroxyl group : 1 eq) of the epoxy resin (21) of the formula (2):

$R_1$, $R_2$ and $R_3$: the formula (C-19)
m+n: 2.1 in average
epoxide equivalent weight: 636
hydrolyzable chlorine content: 0.085%
softening point: 91.0° C.
melt viscosity (at 150° C.): 6.2 poise, 595 parts of the epoxy resin (9):
epoxide equivalent weight: 436
hydrolyzable chlorine content: 0.070%
softening point: 80.5° C.
melt viscosity (at 150° C.): 4.8 poise were obtained. In the thus obtained epoxy resin (9), about 1.1 out of 2.1 alcoholic hydroxyl groups in the starting epoxy resin (21) were epoxidized as calculated based on the epoxide equivalent weight.

As a comparison, in the same procedures as described above except for increasing the amount of 98.5% NaOH to 60.9 parts (1.5 mol), 600 parts of the epoxy resin (33):
epoxide equivalent weight: 339
hydrolyzable chlorine content: 0.092%
softening point: 75.1° C.
melt viscosity (at 150° C.): 4.0 poise were obtained. In the resultant epoxy resin (33), 2.1 alcoholic hydroxyl groups in the starting epoxy resin (21) were entirely epoxidized as calculated based on the epoxide equivalent weight.

Further, the resultant epoxy resin (9), the epoxy resins (21) and (33) as the comparison were blended in the same manner as in Example 1 in the compositions shown in Table 5 (values based on parts by weight) to obtain epoxy resin composition. They were further cured in the same manner as in Example 1 and physical properties of the cured products were measured. The results are shown in Table 5.

TABLE 5

| Item | Example 8 | Example 9 | Comparative Example 11 | Comparative Example 12 | Comparative Example 13 | Comparative Example 14 |
|---|---|---|---|---|---|---|
| Epoxy resin (8) | 100 | | | | | |
| Epoxy resin (9) | | 100 | | | | |
| Epoxy resin (20) | | | 100 | | | |
| Epoxy resin (32) | | | | 100 | | |
| Epoxy resin (21) | | | | | 100 | |
| Epoxy resin (33) | | | | | | 100 |
| Property of resin | | | | | | |
| Epoxide equivalent weight (g/eq) | 320 | 436 | 496 | 247 | 636 | 339 |
| Hydrolyzable chlorine content (%) | 0.069 | 0.070 | 0.104 | 0.035 | 0.085 | 0.092 |
| Softening point (°C.) | 60.0 | 80.5 | 65.0 | 55.0 | 91.0 | 75.1 |
| Melt viscosity (150° C., ps) | 2.0 | 4.8 | 2.2 | 1.8 | 6.2 | 4.0 |
| Blend | | | | | | |
| KAYAHARD MCD | 50.1 | 36.7 | 32.3 | 64.9 | 25.2 | 47.3 |
| 2E4MZ | 1 | 1 | 1 | 1 | 1 | 1 |
| Property of cured product | | | | | | |
| Heat distortion | 140 | 171 | 106 | 159 | 149 | 186 |
| temperature (°C.) | | | | | | |
| Bending strength (25° C., kg/mm$^2$) | 12.9 | 12.0 | 13.5 | 10.3 | 12.1 | 10.4 |
| Bending strength (125° C., kg/mm$^2$) | 5.9 | 6.3 | 0 | 6.1 | 5.8 | 6.6 |
| Breaking energy (25° C., kg/mm) | 138 | 95 | 157 | 51 | 57 | 43 |
| Breaking energy (125° C., kg/mm) | 65 | 52 | 0 | 29 | 35 | 25 |
| Water absorption (boiling/20 hr, %) | 1.18 | 1.19 | 1.87 | 1.09 | 1.33 | 1.16 |

EXAMPLE 10, COMPARATIVE EXAMPLES 15-16

In the same procedures as those in Example 7 except for using, instead of the epoxy resin (19), 366 parts (alcoholic hydroxyl group : 1 eq) of the epoxy resin (22) of the formula (2):

$R_1$, $R_2$ and $R_3$: the formula (C-20)
m+n: 2.9 in average
epoxide equivalent weight: 531
hydrolyzable chlorine content: 0.105%
softening point: 161° C., 370 parts of the epoxy resin (10):
epoxide equivalent weight: 327
hydrolyzable chlorine content: 0.065%
softening point: 65.0° C.
melt viscosity (at 150° C.): 7.8 poise were obtained. In the thus obtained epoxy resin (10), about 1.5 out of 2.9 alcoholic hydroxyl groups in the starting epoxy resin (22) were epoxidized as calculated based on the epoxide equivalent weight.

As a comparison, in the same procedures as described above except for increasing the amount of 98.5% NaOH to 60.9 parts (1.5 mol), 365 parts of the semi-solid epoxy resin (34):
epoxide equivalent weight: 250
hydrolyzable chlorine content: 0.085%
melt viscosity (at 150° C.): 6.8 poise were obtained. In the resultant epoxy resin (34), 2.9 alcoholic hydroxyl groups in the starting epoxy resin (22) were entirely epoxidized as calculated based on the epoxide equivalent weight.

Further, the resultant epoxy resin (10), the epoxy resins (22) and (34) as the comparison were blended in the same manner as in Example 1 in the compositions shown in Table 6 (values based on parts by weight) to obtain epoxy resin compositions. They were further cured in the same manner as in Example 1 and physical properties of the cured products were measured. The results are shown in Table 6.

EXAMPLE 11, COMPARATIVE EXAMPLES 17-18

In the same procedures as those in Example 7 except for using, instead of the epoxy resin (19), 424 parts (alcoholic hydroxyl group : 1 eq) of the epoxy resin (23) of the formula (2):

$R_1$, $R_2$ and $R_3$: the formula (C-13)
m+n: 2.2 in average
epoxide equivalent weight: 466
hydrolyzable chlorine content: 0.090%
softening point: 55.0° C.
melt viscosity (at 150° C.): 3.8 poise, 380 parts of the semi-solid epoxy resin (11):
  epoxide equivalent weight: 321
  hydrolyzable chlorine content: 0.053%
  melt viscosity (at 150° C.): 3.3 poise
were obtained. In the thus obtained epoxy resin (11), about 1.1 out of 2.2 alcoholic hydroxyl groups in the starting epoxy resin (23) were epoxidized as calculated based on the epoxide equivalent weight.

As a comparison, in the same procedures as described above except for increasing the amount of 98.5% NaOH to 60.9 parts (1.5 mol), 380 parts of the semi-solid epoxy resin (35):
  epoxide equivalent weight: 251
  hydrolyzable chlorine content: 0.055%
  melt viscosity (at 150° C.): 3.0 poise
were obtained. In the resultant epoxy resin (35), 2.2 alcoholic hydroxyl groups in the starting epoxy resin (23) were entirely epoxidized as calculated based on the epoxide equivalent weight.

Further, the resultant epoxy resin (11), the epoxy resins (23) and (35) as the comparison were blended in the same manner as in Example 1 in the compositions shown in Table 6 (values based on parts by weight) to obtain epoxy resin compositions. They were further cured in the same manner as in Example 1 and physical properties of the cured products were measured. The results are shown in Table 6.

TABLE 6

|  | Example | | Comparative Example | | | |
|---|---|---|---|---|---|---|
|  | 10 | 11 | 15 | 16 | 17 | 18 |
| Epoxy resin (10) | 100 | | | | | |
| Epoxy resin (11) | | 100 | | | | |
| Epoxy resin (22) | | | 100 | | | |
| Epoxy resin (34) | | | | 100 | | |
| Epoxy resin (23) | | | | | 100 | |
| Epoxy resin (35) | | | | | | 100 |
| Property of resin | | | | | | |
| Epoxide equivalent weight (g/eq) | 327 | 321 | 531 | 250 | 466 | 251 |
| Hydrolyzable chlorine content (%) | 0.065 | 0.053 | 0.105 | 0.085 | 0.090 | 0.055 |
| Softening point (°C.) | 65.0 | semi-solid | 162.0 | semi-solid | 55.0 | semi-solid |
| Melt viscosity (150° C., ps) | 7.8 | 3.3 | — | 6.8 | 3.8 | 3.0 |
| Blend | | | | | | |
| KAYAHARD MCD | 49.0 | 49.9 | 29.0 | 68.2 | 34.4 | 63.8 |
| 2E4MZ | 1 | 1 | 1 | 1 | 1 | 1 |
| Property of cured product | | | | | | |
| Heat distortion temperature (°C.) | 170 | 155 | 141 | 183 | 116 | 183 |
| Bending strength (25° C., kg/mm$^2$) | 10.3 | 11.5 | 10.5 | 8.0 | 11.8 | 10.0 |
| Bending strength (125° C., kg/mm$^2$) | 5.3 | 6.3 | 5.1 | 5.6 | 0 | 6.5 |
| Breaking energy (25° C., kg/mm) | 105 | 103 | 112 | 55 | 84 | 48 |
| Breaking energy (125° C., kg/mm) | 56 | 56 | 30 | 30 | 0 | 27 |
| Water absorption (boiling/20 hr, %) | 1.71 | 1.35 | 2.20 | 1.37 | 2.20 | 1.23 |

EXAMPLE 12, COMPARATIVE EXAMPLES 19–20

In the same procedures as those in Example 7 except for using, instead of the epoxy resin (19), 334 parts (alcoholic hydroxyl group: 1 eq) of the epoxy resin (24) of the formula (2):
  $R_1$, $R_2$ and $R_3$: the formula (d-1)
  m+n: 2.3 in average
  epoxide equivalent weight: 384
  hydrolyzable chlorine content: 0.093%
  softening point: 76.0° C.
  melt viscosity (at 150° C.): 6.5 poise,
305 parts of the epoxy resin (12):
  epoxide equivalent weight: 261
  hydrolyzable chlorine content: 0.085%
  softening point: 71.0° C.
  melt viscosity (at 150° C.): 5.8 poise
were obtained. In the thus obtained epoxy resin (12), about 1.2 out of 2.3 alcoholic hydroxyl groups in the starting epoxy resin (24) were epoxidized as calculated based on the epoxide equivalent weight.

As a comparison, in the same procedures as described above except for increasing the amount of 98.5% NaOH to 60.9 parts (1.5 nmol), 320 parts of the epoxy resin (36):
  epoxide equivalent weight: 209
  hydrolyzable chlorine content: 0.082%
  softening point: 65.0° C.
  melt viscosity (at 150° C.): 5.0 poise
were obtained. In the resultant epoxy resin (36), 2.3 alcoholic hydroxyl groups in the starting epoxy resin (24) were entirely epoxidized as calculated based on the epoxide equivalent weight.

Further, the resultant epoxy resin (12), the epoxy resins (24) and (36) as the comparison were blended in the same manner as in Example 1 in the compositions shown in Table 7 (values based on parts by weight) to obtain epoxy resin composition. They were further cured in the same manner as in Example 1 and physical properties of the cured products were measured. The results are shown in Table 7.

TABLE 7

|  | Example | Comparative Example | |
|---|---|---|---|
|  | 12 | 19 | 20 |
| Epoxy resin (12) | 100 | | |
| Epoxy resin (24) | | 100 | |
| Epoxy resin (36) | | | 100 |
| Property of resin | | | |
| Epoxide equivalent weight (g/eq) | 261 | 384 | 209 |
| Hydrolyzable chlorine content (%) | 0.085 | 0.093 | 0.082 |
| Softening point (°C.) | 71.0 | 76.0 | 65.0 |
| Melt viscosity (150° C., ps) | 5.8 | 6.5 | 5.0 |
| Blend | | | |
| KAYAHARD MCD | 61.4 | 41.7 | 76.7 |
| 2E4MZ | 1 | 1 | 1 |
| Property of cured product | | | |
| Heat distortion temperature (°C.) | 201 | 160 | 212 |
| Bending strength (25° C., kg/mm$^2$) | 10.8 | 9.1 | 10.6 |
| Bending strength (125° C., kg/mm$^2$) | 6.8 | 6.5 | 6.6 |
| Breaking Energy (25° C., kg/mm) | 100 | 105 | 60 |
| Breaking Energy (125° C., kg/mm) | 59 | 35 | 30 |
| Water absorption (boiling/20 hr, %) | 1.55 | 1.72 | 1.50 |

EXAMPLE 13, COMPARATIVE EXAMPLES 21–22

After dissolving 242 parts (1 mol) of 4,4'-bishydroxy-3,3',5,5'-tetramethylbiphenyl into 61 parts (0.066 mol) of epichlorohydrine and 370 parts of dimethyl sulfoxide, 29.5 parts (0.73 mol) of 98.5% NaOH was added under stirring at 70° C. for 30 min. After the addition, the mixture was further reacted at 70° C. for one hour and, further, at 90° C. for 5 hours. After the reaction was completed, the reaction mixture was washed with 800 parts of methyl isobutyl ketone and 300 parts of water. After oil/water separation, methyl isobutyl ketone and dimethyl sulfoxide were recovered by distillation under a reduced pressure from the oil layer to obtain 278 parts of the compound (1) represented by the general formula (3) in which each of $R_1$, $R_2$ and $R_3$ is represented by the formula (b-2) and m+n is 2.2 in average.

In the same procedures as those in Example 7 except for using 224 parts of the resultant compound (1) (phenolic hydroxyl group: 0.5 eq, alcoholic hydroxyl group: 0.55 eq) and increasing the amount of 98.5% NaOH from 26.4 parts to 34.9 parts (0.86 mol), 250 parts of the epoxy resin (13):
    epoxide equivalent weight: 350
    hydrolyzable chlorine content: 0.101%
    softening point: 89.1° C.
    melt viscosity (at 150° C.): 7.2 poise
were obtained. In the resultant epoxy resin (13), 2 phenolic hydroxyl groups and about 1.1 out of 2.2 alcoholic hydroxyl groups in the starting compound (1) were epoxidized as calculated based on the epoxide equivalent weight.

As a comparison, in the same procedures as above, except for decreasing the amount of 98.5% NaOH to 20.3 parts (0.5 mol), 245 parts of the epoxy resin (25):
    epoxide equivalent weight: 512
    hydrolyzable chlorine content: 0.098%
    softening point: 137.7° C.
were obtained. In the resultant epoxy resin (25), only the phenolic hydroxyl groups in the starting compound (1) were epoxidized.

In the same procedures, except for increasing the amount of 98.5% NaOH to 54.0 parts (1.33 mol), 452 parts of the epoxy resin (37):
    epoxide equivalent weight: 273
    hydrolyzable chlorine content: 0.095%
    softening point: 80.1° C.
    melt viscosity (at 150° C.) of 6.8 poise
were obtained. In the resultant epoxy resin (37), 2 phenolic hydroxyl groups and 2.2 alcoholic hydroxyl groups in the starting compound (1) were entirely epoxidized as calculated based on the epoxide equivalent weight.

Further, the resultant epoxy resin (13), the epoxy resins (25) and (37) as the comparison were blended in the same procedures as those in Example 1 in the compositions shown in Table 8 (values based on parts by weight) to obtain epoxy resin compositions. They were further cured in the same procedures as those in Example 1 and physical properties of the cured products were measured. The results are shown in Table 8.

TABLE 8

|  | Example 13 | Comparative Example 21 | Comparative Example 22 |
|---|---|---|---|
| Epoxy resin (13) | 100 |  |  |
| Epoxy resin (25) |  | 100 |  |
| Epoxy resin (37) |  |  | 100 |
| Property of resin |  |  |  |
| Epoxide equivalent weight (g/eq) | 350 | 512 | 273 |
| Hydrolyzable chlorine content (%) | 0.101 | 0.098 | 0.095 |
| Softening point (°C.) | 89.1 | 137.7 | 80.1 |

TABLE 8-continued

|  | Example 13 | Comparative Example 21 | Comparative Example 22 |
|---|---|---|---|
| Melt viscosity (150° C., ps) | 7.2 | — | 6.8 |
| Blend |  |  |  |
| KAYAHARD MCD | 45.8 | 31.3 | 58.7 |
| 2E4MZ | 1 | 1 | 1 |
| Property of cured product |  |  |  |
| Heat distortion temperature (°C.) | 170 | 139 | 191 |
| Bending strength (25° C., kg/mm²) | 10.9 | 11.1 | 10.5 |
| Bending strength (125° C., kg/mm²) | 6.1 | 6.0 | 5.5 |
| Breaking Energy (25° C., kg/mm) | 115 | 121 | 85 |
| Breaking Energy (125° C., kg/mm) | 60 | 41 | 29 |
| Water absorption (boiling/20 hr, %) | 1.28 | 2.01 | 1.20 |

EXAMPLE 14, COMPARATIVE EXAMPLES 23-24

In the same procedures as those in Example 7 except for using, instead of the epoxy resin (19), 627 parts (alcoholic hydroxyl group: 1 eq) of the epoxy resin (26) represented by the formula (2):
    $R_1$, $R_2$ and $R_3$: the formula (e-1)
    m+n: 2.1 in average
    epoxide equivalent weight: 658
    hydrolyzable chlorine content: 0.099%
    softening point: 165° C.,
and using 462.5 parts of 1,3-dimethyl-2-imidazolidinone instead of 5 parts of tetramethyl ammonium chloride, 630 parts of the epoxy resin (14):
    epoxide equivalent weight: 444
    hydrolyzable chlorine content: 0.109%
    softening point: 151.2° C.
were obtained. In the resultant epoxy resin (14), about 1.1 out of 2.1 alcoholic hydroxyl groups in the starting epoxy resin (26) were epoxidized as calculated based on the epoxide equivalent weight.

As a comparison, in the same procedures as above, except for increasing the amount of 98.5% NaOH to 60.9 parts (1.5 mol), 635 parts of the epoxy resin (38):
    epoxide equivalent weight: 349
    hydrolyzable chlorine content: 0.093%
    softening point: 148.0° C.
were obtained. In the resultant epoxy resin (38), 2.1 alcoholic hydroxyl groups in the starting epoxy resin (26) were entirely epoxidized as calculated based on the epoxide equivalent weight.

Further, the resultant epoxy resin (14) and the epoxy resins (26) and (38) as the comparison were blended in the same procedures as in Example 1 with the compositions shown in Table 9 (values based on parts by weight) to obtain epoxy resin compositions. They were further cured in the same procedures as those in Example 1 and physical properties of the cured products were measured. Results are shown in Table 9.

TABLE 9

|  | Example 14 | Comparative Example 23 | Comparative Example 24 |
|---|---|---|---|
| Epoxy resin (14) | 100 |  |  |
| Epoxy resin (26) |  | 100 |  |

TABLE 9-continued

|  | Example | Comparative Example |  |
|---|---|---|---|
|  | 14 | 23 | 24 |
| Epoxy resin (38) |  |  | 100 |
| Property of resin |  |  |  |
| Epoxide equivalent weight (g/eq) | 444 | 658 | 349 |
| Hydrolyzable chlorine content (%) | 0.109 | 0.099 | 0.093 |
| Softening point (°C.) | 151.2 | 165.0 | 148.0 |
| Blend |  |  |  |
| KAYAHARD MCD | 36.1 | 24.3 | 45.9 |
| 2E4MZ | 1 | 1 | 1 |
| Property of cured product |  |  |  |
| Heat distortion temperature (°C.) | 170 | 150 | 205 |
| Bending strength (25° C., kg/mm²) | 11.5 | 11.1 | 11.8 |
| Bending strength (125° C., kg/mm²) | 6.9 | 6.2 | 6.6 |
| Breaking Energy (25° C., kg/mm) | 102 | 105 | 60 |
| Breaking Energy (125° C., kg/mm) | 55 | 30 | 31 |
| Water absorption (boiling/20 hr, %) | 1.25 | 1.40 | 1.20 |

EXAMPLE 15

After dissolving 222 parts (1 mol) of diglycidyl ether of resorcine and 550 parts of resorcine (5 mol) into 780 parts of methyl isobutyl ketone, 13.4 parts (0.1 mol) of 30% NaOH was added under stirring at 70° C. After the addition, reaction was taken place at 70° C. for one hour and, further, at 85° C. for 8 hours. After the reaction was completed, the reaction mixture was washed twice with 400 parts of water. After oil/water separation, methyl isobutyl ketone and resorcine were recovered by distillation from the oil layer to obtain 444 parts of the compound (2) represented by general formula (3) in which each of $R_1$, $R_2$ and $R_3$ is represented by the formula (a-1) and $m+n$ is 2.6 in average.

After dissolving 135 parts of the resultant compound (2) (phenolic hydroxyl group: 0.5 eq, alcoholic hydroxyl group: 0.65 eq) into 925 parts (10 mol) of epichlorohydrine and 462.5 parts of dimethyl sulfoxide, 36.5 parts (0.9 mol) of 98.5% NaOH was added under stirring at 70° C. for 70 min. After the addition, reaction was further taken place at 70° C. for 3 hours. Then, most of dimethyl sulfoxide and unreacted excess epichlorohydrine were recovered by distillation under a reduced pressure, and the reaction products containing the by-produced salts and dimethyl sulfoxide were dissolved into 750 parts of methyl isobutyl ketone, to which 10 parts (0.10 mol) of 30% NaOH was further added and reacted at 70° C. for one hour. After the reaction was completed, the reaction mixture was washed twice with 200 parts of water. After oil/water separation, methyl isobutyl ketone was recovered by distillation from the oil layer to obtain 185 parts of the epoxy resin (39):

epoxide equivalent weight: 211
    hydrolyzable chlorine content: 0.095%.

In the resultant epoxy resin (39), 2 phenolic hydroxyl groups and about 1.5 out of 2.6 alcoholic hydroxyl groups in the starting compound (2) were epoxidized as calculated based on the epoxide equivalent weight. Further, the epoxy resin (39) was separated into each of compounds by liquid chromatography, concentrated and then subjected to NMR and Mass spectroscopy to confirm the structure. The epoxy resin (39) contained the epoxy resin according to the present invention by 52.3%. The results are shown in Table 10.

TABLE 10

| Component | Formula (1) m | Formula (1) n | Liquid chromatography (%) |
|---|---|---|---|
| a | 0 | 0 | 2.0 |
| b | 0 | 2 | 20.8 |
| c | 1 | 1 | 32.4 |
| d | 1 | 3 | 6.5 |
| e | 2 | 0 | 11.3 |
| f | 2 | 2 | 9.0 |
| g | 3 | 1 | 4.4 |
| h | 4 | 0 | 1.2 |

As compared with the epoxy resin represented by the formula (2) and the epoxy resin prepared from the epoxy resin represented by the formula (2) by entirely epoxidizing the alcoholic hydroxyl groups thereof, the epoxy resins according to the present invention can provide laminated boards having excellent heat resistance, measling resistance and adhesion property as evident from Table 2. In addition, as evident from Table 1 and Tables 3-9, the cured products obtained by using the epoxy resin in which alcoholic hydroxyl groups are entirely epoxidized are brittle, but the cured products obtained from the epoxy resin according to the present invention are excellent in heat resistance, toughness and water proofness.

What is claimed is:

1. An epoxy resin represented by the formula (1):

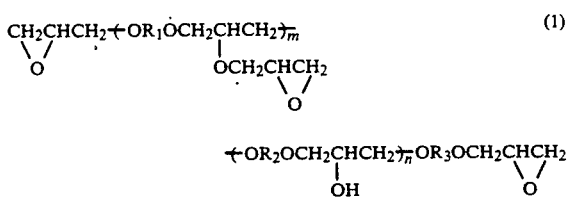

wherein $R_1$, $R_2$ and $R_3$, independently represent a divalent group represented by the formula:

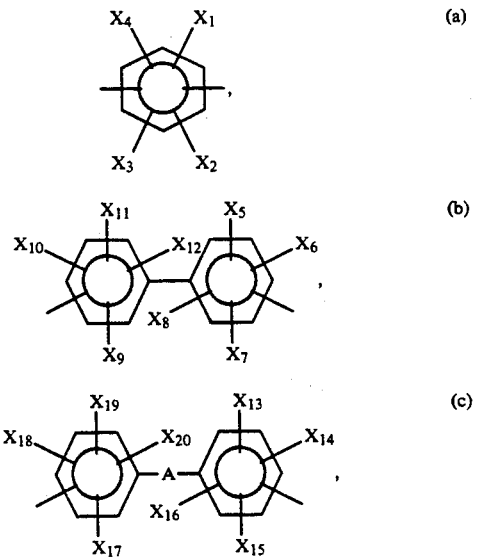

-continued

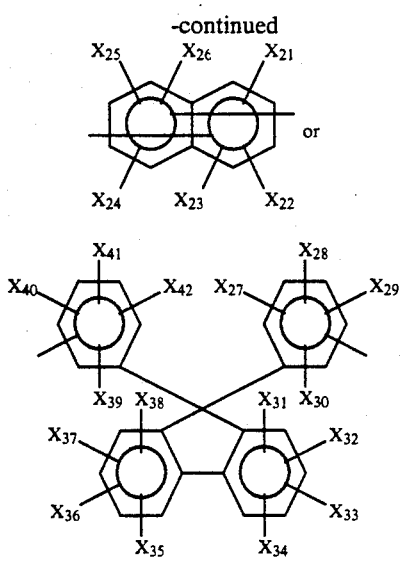

wherein A represents alkylene, cycloalkylene; alkylene substituted by halogen, cycloalkyl or aryl; —O—, —S—; —S—S—;

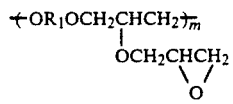

$X_1$ through $X_{42}$ independently represent hydrogen, an alkyl group or halogen, m and n each represents an integer of 1 or greater and $m/(m+n)$ is from 0.10 to 0.80 and,

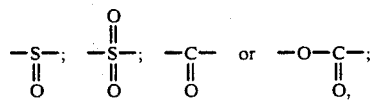

and

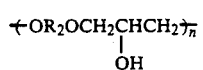

are arranged in a random sequence.

2. An epoxy resin as defined in claim 1, in which $m/(m+n)$ in the formula (1) is from 0.15 to 0.60.

3. An epoxy resin as defined in claim 1, wherein each of $R_1$, $R_2$ and $R_3$ in the formula (1) is represented by:

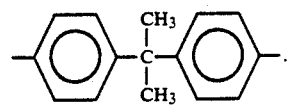

4. An epoxy resin as defined in claim 1, wherein each of $R_1$, $R_2$ and $R_3$ in the formula (1) is represented by:

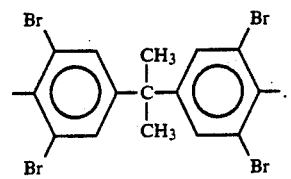

5. An epoxy resin as defined in claim 1, wherein each of $R_1$, $R_2$ and $R_3$ in the formula (1) represents independently

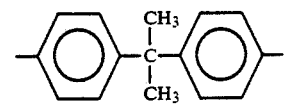

or

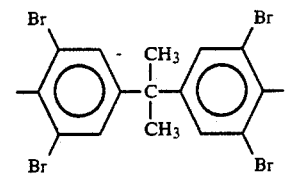

providing that all of them are not identical.

6. An epoxy resin as defined in claim 1, having a hydrolyzable chlorine content not greater than 0.15%.

7. An epoxy resin composition comprising the epoxy resin as defined in any one of claims 1, 2, 3, 4, 5 or 6, a curing agent, and a curing promoter as an optional component.

8. A cured product of the epoxy resin composition as defined in claim 7.

9. An epoxy resin composition for use in a laminated board, comprising the epoxy resin composition as defined in claim 7.

* * * * *